Feb. 12, 1924.
T. C. WHITEHEAD
VEHICLE WHEEL
Filed Jan. 15, 1923
1,483,398
3 Sheets-Sheet 3
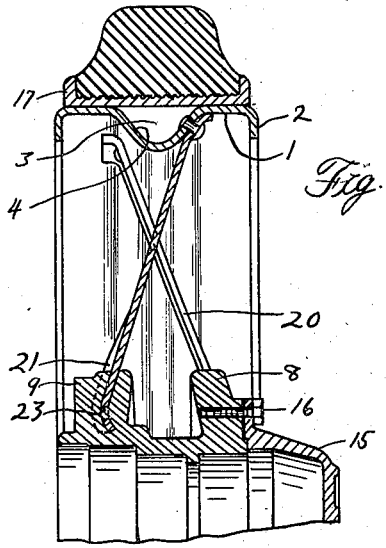
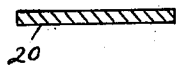
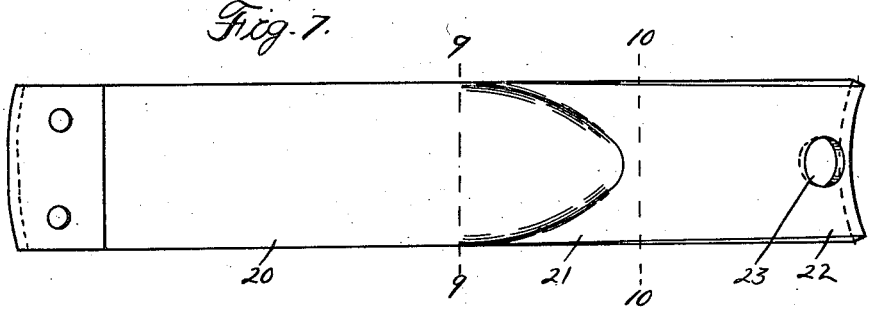
Inventor
Thomas C. Whitehead Patented Feb. 12, 1924.

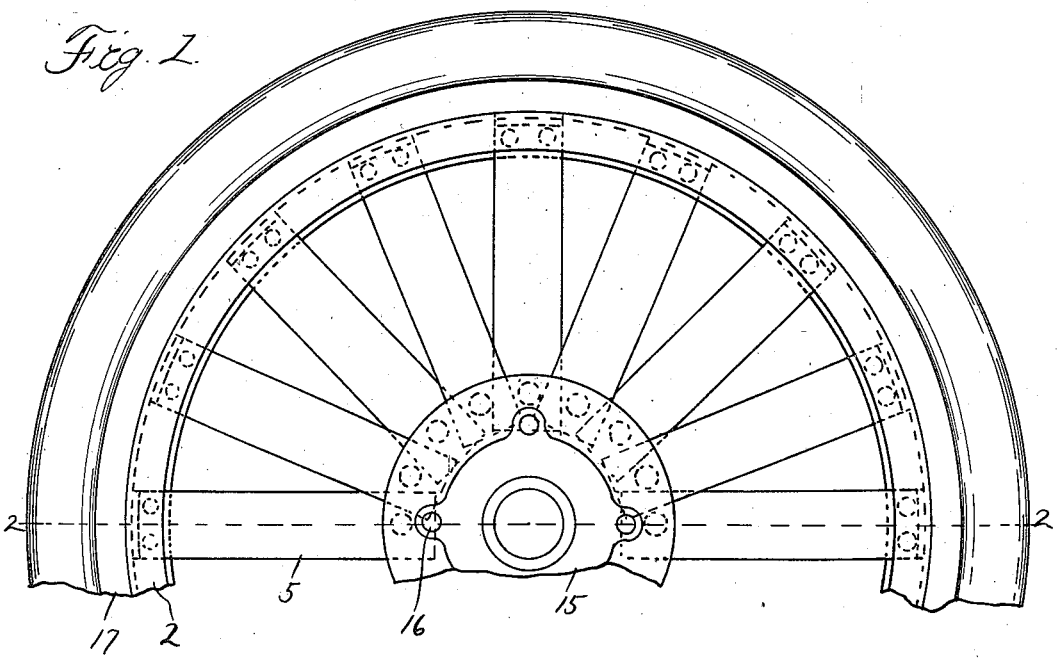
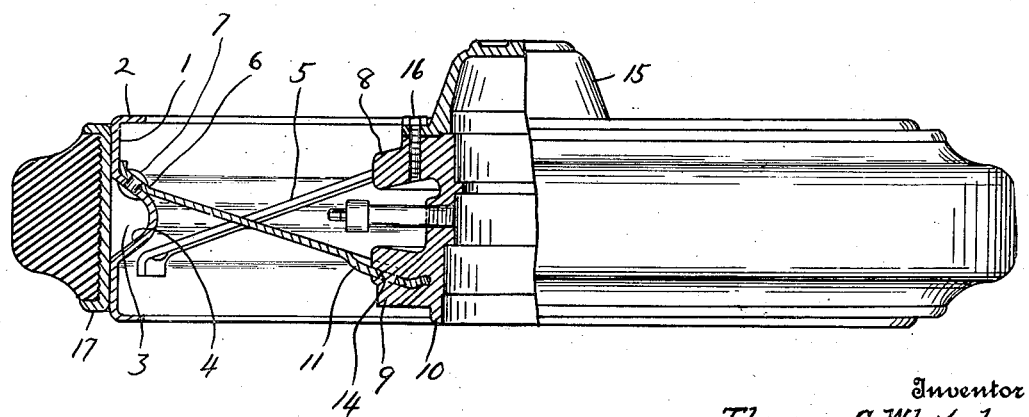

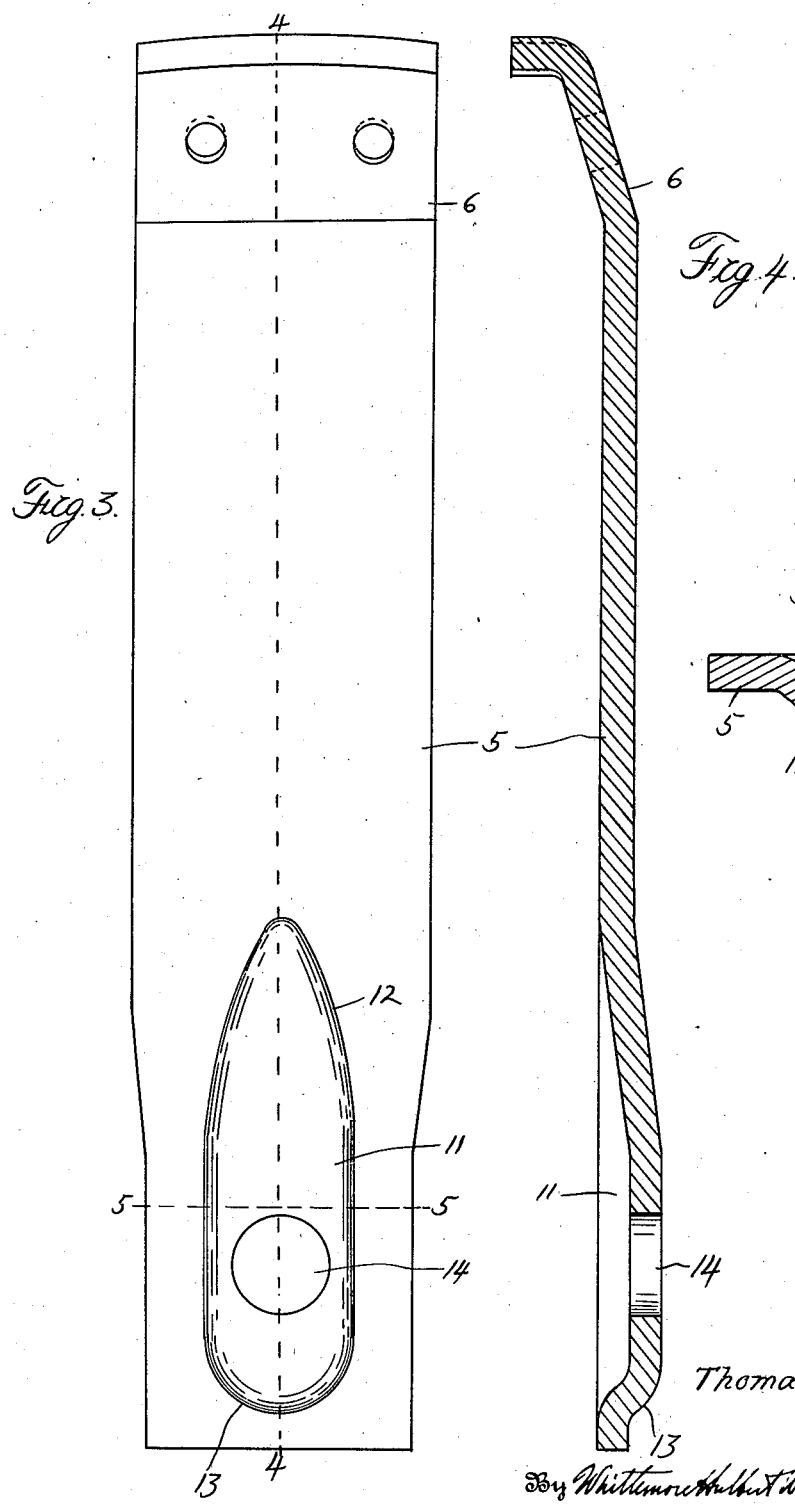

1,483,398

UNITED STATES PATENT OFFICE.

THOMAS C. WHITEHEAD, OF RIVER ROUGE, MICHIGAN, ASSIGNOR TO WHITEHEAD & KALES COMPANY, OF RIVER ROUGE, MICHIGAN, A CORPORATION OF MICHIGAN.

VEHICLE WHEEL.

Application filed January 15, 1923. Serial No. 612,719.

*To all whom it may concern:*

Be it known that I, THOMAS C. WHITEHEAD, a citizen of the United States of America, residing at River Rouge, in the county of Wayne and State of Michigan, have invented certain new and useful Improvements in Vehicle Wheels, of which the following is a specification, reference being had therein to the accompanying drawings.

This invention relates to vehicle wheels and refers more particularly to wheels for trailers and the like.

An object of the invention is to provide simple and efficient means for reinforcing the wheel spokes at their inner ends so that they will not break or shear off at the point of connection with the wheel hub.

Another object is to provide a strong and durable wheel which is simple in construction and which can be manufactured at a comparatively low cost.

With the above and other objects in view the invention consists in certain novel features of construction, combination and arrangement of parts as will be more fully described and particularly pointed out in the appended claims.

In the accompanying drawings:

Figure 1 is a fragmentary elevation of a wheel embodying my invention;

Figure 2 is a sectional view taken on line 2—2 of Figure 1;

Figure 3 is a detail elevation of one of the spokes;

Figure 4 is a sectional view taken on line 4—4 of Figure 3;

Figure 5 is a detailed sectional view taken on line 5—5 of Figure 3;

Figure 6 is a fragmentary sectional view of a wheel embodying my invention, but showing a slightly modified spoke construction;

Figure 7 is a detail elevation of the modified form of spoke;

Figure 8 is a sectional view taken on line 8—8 of Figure 7;

Figure 9 is a detail sectional view taken on line 9—9 of Figure 7;

Figure 10 is a detail sectional view taken on line 10—10 of Figure 7.

With certain constructions of wheels heretofore used the spokes have been constructed from flat metal bars which have been united to the hub by being cast therein, but it has been found that there is a tendency for the flat spokes to break or shear off at the point of attachment. To avoid this objectionable feature certain other constructions of wheels have been made in which the hubs have radially extending flanges to which the spokes are secured by riveting. However, with such constructions, in order to secure the requisite strength in the attachment flanges, the hubs are usually formed of cast steel which necessarily increases the cost of manufacture. Should the hubs be formed of cast iron the dimensions are necessarily such that the weight of the wheel is materially increased.

With my present invention all of the objectionable features referred to above are overcome entirely. In detail, the numeral 1 designates the wheel rim which may be constructed of any suitable material, but it is preferably of channel shape in cross section with the flanges 2 thereof turned radially inward. The central portion of the rim is preferably formed with an annular recess 3 having inclined sides 4 which are utilized as a means of attachment for the spokes 5. These spokes are preferably formed from straight flat bars of wrought metal which are bent very slightly at their outer ends as shown at 6 and are rigidly secured to the inclined sides 4 of the annular recess in the rim by means of rivets 7. Preferably, the spokes are crossed as shown in Figure 2 and are cast into spaced annular flanges 8 and 9 respectively formed integral with a hub, 10 which may be constructed of any suitable material.

In order to reinforce the joint between the hub and the spokes, the central portion of each spoke at the inner end thereof is preferably embossed as shown at 11. This embossed portion preferably extends longitudinally of the spokes and is substantially crescent shaped in cross-section. A portion of the embossed portion 11 of each spoke is also cast into the hub flanges so that it is apparent that the spokes are not apt to break or shear off at this point. The embossed portion 11 of each spoke is preferably tapered at one end as shown as 12 while the opposite end is preferably rounded as shown at 13. To provide additional strengthening means for the joint between the hub flanges and the spokes, the embossed portion 11 of each spoke is preferably provided with apertures 14 into which the metal of the flanges flows during the casting operation.

A suitable hub cap 15 is adapted to be secured to either flange upon the hub by means of bolts 16 while a suitable tire rim 17 is preferably mounted on the wheel rim 1.

In the modification illustrated in Figures 6 to 10 inclusive, each spoke 20 is constructed from flat bar stock and is formed at its outer end similar to the spokes 5, but each spoke 20 is provided at its inner end with an embossed portion 21 which extends from one edge to the other and which is substantially crescent shape in cross-sections as illustrated in Figure 10 of the drawings. The spokes 20 are preferably crossed similar to the spokes 5 and are also cast into the flanges 9 and 10 respectively of the hub. A portion of the embossed portion 21 of each spoke 20 is also cast into the hub flanges in a manner similar to the embossed portions of the spokes 5.

Besides being embossed each spoke 20 is also preferably curved at its inner end as shown at 22 to provide an improved anchor. The embossed portion of each spoke 20 is also preferably provided with an opening 23 in which the metal of the hub flanges flows during the casting operation.

While it is believed that from the foregoing description, the nature and advantages of the invention will be readily apparent, I desire to have it understood that I do not limit myself to what is herein shown and described and that such changes may be resorted to as fall within the scope of what is claimed.

What I claim as my invention is:

1. In a vehicle wheel, the combination with a hub and a plurality of spokes having portions cast into said hub, and means for reinforcing the portion of each spoke cast into said hub.

2. In a vehicle wheel, the combination with a hub and a plurality of inclined spokes having portions cast into said hub, and means for reinforcing the portion of each spoke cast into said hub.

3. In a vehicle wheel, the combination with a rim and a hub, of a plurality of spokes secured to said rim and cast into said hub, said spokes being provided with means for reinforcing the same at the point of connection with said hub.

4. In a vehicle wheel, the combination with a rim and a hub, of a plurality of spokes secured to said rim and cast into said hub, said spokes being embossed to reinforce the same at said hub.

5. In a vehicle wheel, the combination with a rim, of a series of inclined spokes extending radially inward therefrom, a hub cast upon said spokes at the inner ends thereof, and means for reinforcing said spokes at the point of connection with said hub.

6. In a vehicle wheel, the combination with a rim and a hub, of a series of spokes connected to said rim and cast into said hub, said spokes being embossed at their inner ends, a portion of the embossed portion of each spoke being also cast into said hub.

7. In a vehicle wheel, the combination with a rim and a hub, of a series of spokes connected to said rim and cast into said hub, each spoke being formed of a flat bar and having an embossed portion, a part of the embossed portion of each spoke being also cast into said hub.

8. In a vehicle wheel, the combination with a rim and a hub, of a series of spokes connected to said rim and cast into said hub, each spoke being formed of a flat bar and having an embossed portion, said embossed portion being substantially crescent shape in cross-section, a portion of the embossed portion of each spoke being also cast into said hub.

9. In a vehicle wheel, the combination with a rim and a hub, of a series of spokes connected to said rim and cast into said hub, each spoke being formed of a flat bar and having an embossed portion, said embossed portion extending longitudinally of said spoke, a part of the embossed portion of each spoke being also cast into said hub.

10. In a vehicle wheel, the combination with a rim and a hub, of a series of spokes connected to said rim and cast into said hub, each spoke being formed of a flat bar and having an embossed portion, said embossed portion extending longitudinally of said spokes and being substantially crescent shape in cross-section, a part of the embossed portion of each spoke being also cast into said hub.

11. In a vehicle wheel, a plurality of spokes comprising bars having embossed portions at their inner ends, the embossed portions having apertures therein, and a hub cast upon the inner ends of said bars and having portions extending through the apertures in said embossed portions.

12. In a vehicle wheel, a plurality of spokes having apertures therein at their inner ends, and a hub cast upon the inner ends of said spokes and having portions extending through said apertures.

13. A wheel spoke comprising a bar having a longitudinally extending embossed portion at one end.

14. A wheel spoke comprising a bar having a longitudinally extending embossed portion at one end, said embossed portion being substantially crescent shape in cross-section and having an aperture therein.

In testimony whereof I affix my signature.

THOMAS C. WHITEHEAD.